JOHN C. DURBOROW.

Improvement in Harvester-Rakes.

No. 4,395. Reissued May 23, 1871.

Witnesses.
Edmund Masson
John C. Durborow.
By Atty. A. B. Stoughton.

AM. PHOTO-LITHOGRAPHIC CO. N.Y. (OSBORNE'S PROCESS.)

UNITED STATES PATENT OFFICE.

JOHN C. DURBOROW, OF ELLICOTT CITY, MARYLAND.

IMPROVEMENT IN HARVESTER-RAKES.

Specification forming part of Letters Patent No. 78,654, dated June 9, 1868; Reissue No. 4,395, dated May 23, 1871.

*To all whom it may concern:*

Be it known that I, JOHN C. DURBOROW, of Ellicott City, in the county of Howard and State of Maryland, have invented a new and useful Improvement in Harvester-Rakes; and I do hereby declare that the following is a full, clear, and exact description of the construction and operation of the same, reference being had to the accompanying drawing, making a part of this specification, in which—

Figure 1:
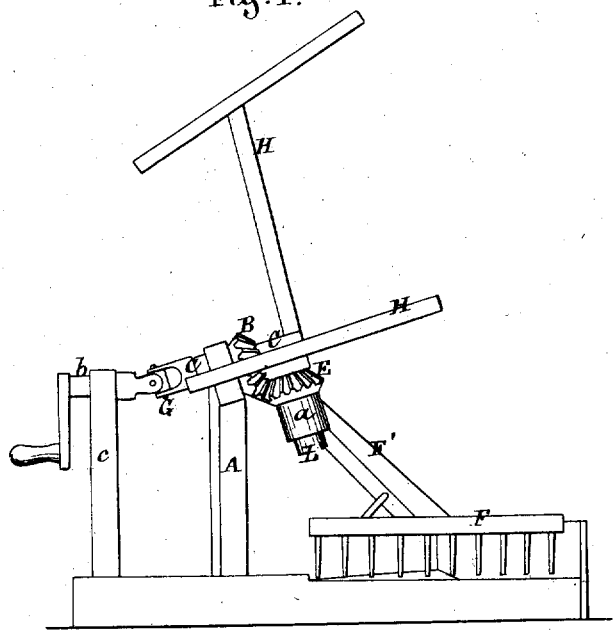
Figure 2:
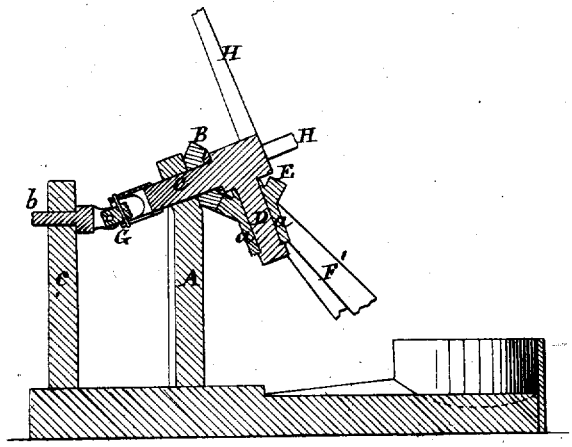

Figure 1 is a front elevation, and Fig. 2 is a vertical transverse section.

The nature of my invention consists in operating a revolving rake upon a reaping or mowing machine on an inclined plane, by means of two beveled cog-wheels, one of the wheels being movable and the other stationary, through which passes and revolves the driving-shaft, which shaft is arranged and works on a line inclined about thirty degrees from a horizontal line to give better sweep to the rake; the line of the shaft of the movable wheel being at about right angles to the driving-shaft; the arm of the rake being also placed out of a line from the shaft of the movable wheel to improve the position and motion of the rake; the platform of the machine being made concave to conform to the revolving motion of the rake, thus giving the rake a continuous, easy, sweeping motion, instead of the irregular motion of the rakes now in use upon such machines.

To enable any one skilled in the art to make and use my invention, I will proceed to describe its construction and operation.

A is a standard, having the top thereof inclined at a suitable angle to make a bearing for the shaft C. B is the stationary beveled cog-wheel, of the proper diameter, and attached to the incline of the standard. C is the driving-shaft, passing through the incline of the standard and the wheel B, and having a short shaft, D, attached at right angles, or thereabout, to the end thereof. E is a movable beveled cog-wheel, whose teeth mesh with those of the stationary one, and having a sleeve, *a*, constructed therewith, and through which sleeve the short shaft D is inserted. The said wheel E is held on the short shaft D by said shaft being diminished in diameter, so that the sleeve will come against a shoulder formed on the end thereof, the wheel being placed on the shaft first, and the shaft then properly attached to the shaft C. F is the rake, the arm F′ of which is attached to the sleeve at such an angle from the same as will bring the rake to a line parallel with the front of the platform, the platform being slightly concave to conform to the revolving motion of the rake.

It will be seen, by the inclination of the shafts C D, the rake is caused to move on an inclined plane, which motion requires less concavity of the platform than if the rake moved in a vertical plane. The inclination of the shafts may be still increased, and thus require but little concavity in the platform.

The power is applied in any suitable manner. I have herein shown it applied through the short shaft *b*, which is arranged horizontally in a standard, *c*, and connects with the driving-shaft C by the universal joint G.

H H are the reel-arms, which are attached to the driving-shaft, the end thereof being made square to receive them.

Having thus fully described my invention, what I claim therein as new, and desire to secure by Letters Patent, is—

The inclined shaft C, provided with the fixed gear-wheel B, in combination with the revolving gear-wheel E and inclined rake and reel arms, constructed and operating in the manner and for the purpose set forth.

JNO. C. DURBOROW.

Witnesses:
A. B. STOUGHTON,
EDMUND MASSON.